W. H. MacKAY.
SELF PROPELLED VEHICLE.
APPLICATION FILED JULY 27, 1914.
1,251,903.
Patented Jan. 1, 1918.
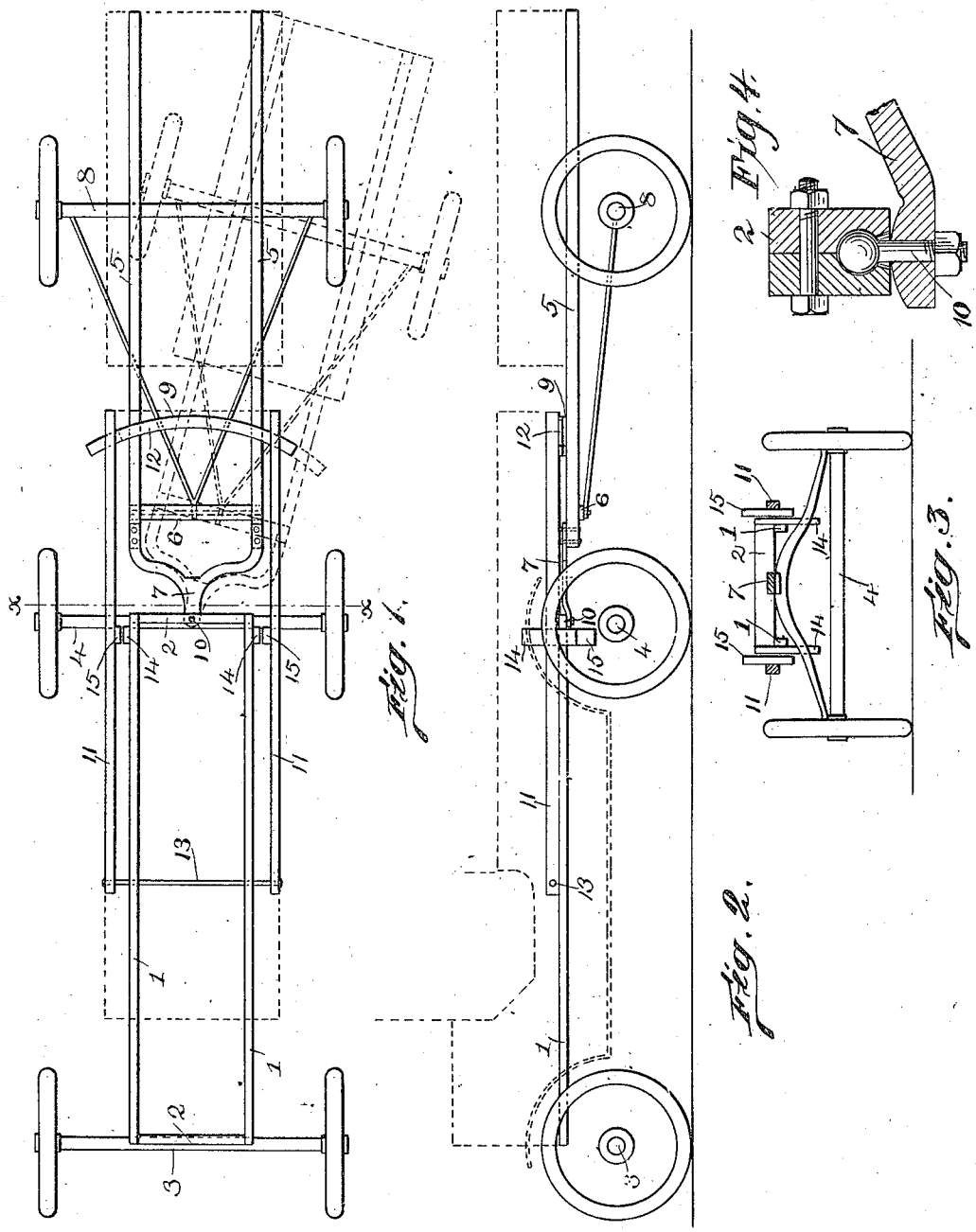

UNITED STATES PATENT OFFICE.

WILLIAM HORACE MacKAY, OF ANDOVER, MAINE, ASSIGNOR TO WILLIAM A. ARNOLD AND WILLIAM H. FLETCHER, OF PATERSON, NEW JERSEY.

SELF-PROPELLED VEHICLE.

1,251,903.	Specification of Letters Patent.	Patented Jan. 1, 1918.

Application filed July 27, 1914. Serial No. 853,397.

*To all whom it may concern:*

Be it known that I, WILLIAM HORACE MACKAY, a citizen of the United States, residing in Andover, in the county of Oxford and State of Maine, have invented certain new and useful Improvements in Self-Propelled Vehicles, of which the following, taken in connection with the accompanying drawings, is a specification.

This invention relates to road vehicles, and more particularly to the frame construction of self-propelled vehicles such as automobiles, motor trucks and the like, the principal object of the invention being to provide a chassis adapted to carry a body of more than ordinary length and to diminish the up-and-down movements transmitted to the body by inequalities in the road, thereby rendering the vehicle more comfortable to ride in and reducing the strains on certain of its parts.

An automobile chassis constructed in accordance with my invention is characterized by the provision of an additional axle located behind those commonly employed, a main frame divided into front and rear portions having a pivotal connection suitable for permitting any one of the axles to move upward and downward with respect to the others, and a superframe which carries the body of the vehicle and is supported on the two portions of the main frame between the pairs of axles instead of over the axles, so that when upward or downward movement of any of the axles occurs the corresponding movement transmitted to the superframe and body is substantially reduced in extent. This arrangement not only improves the easy-riding qualities of the vehicle but also distributes the total weight among the several axles.

In the form of my invention hereinafter described the front portion of the main frame has or may have substantially the same construction as in the chassis of an ordinary automobile, while the rear portion of the main frame consists of a trailer frame having a single axle, which forms the rear axle of the vehicle. This trailer is pivotally connected to the front portion of the main frame in such manner that it can move laterally out of the path of the latter, when rounding a corner, and preferably the pivotal connection has the form of a universal joint adapted to provide for the necessary relative movements of the front and rear portions of the main frame in an upward and downward direction.

In the accompanying drawings, which illustrate the construction diagrammatically and show only such parts as are necessary for an understanding of the invention, Figure 1 shows the frame in plan view;

Fig. 2 is a side elevation of the same;

Fig. 3 is a cross section on the line $x$—$x$ in Fig. 1; and

Fig. 4 is a detail view showing a form of universal joint.

The front portion of the main frame may be constructed in the ordinary manner with side bars 1 united by end pieces 2. This portion of the frame is provided with the usual axle 3 having a pair of wheels, a spring system, and suitable steering mechanism, all of ordinary construction; as well as an axle 4 having a pair of wheels and the usual appurtenances thereto, all amounting to an ordinary automobile running gear. It is to be understood that the illustration is of conventional type, save when something more than ordinary is to be described. The rear portion of the main frame may consist of side bars 5, cross-pieces 6, uniting the side bars, a tongue 7 bifurcated and attached to the side bars 5, an axle 8 and appurtenances connecting with the side bars 5, and a segmental bolster 9 supported preferably in fixed position on the side bars 5. The tongue 7 connects with an end piece 2 of the first member of the main frame, preferably by any convenient type of universal joint, such as the ball and socket joint shown in Fig. 4, of which the bolt 10 is the vertical pivot. This arrangement gives to the bolster 9 the much desired "three point support" sought in vehicle construction. Upon such main frame a superframe rests consisting of side bars 11 united by a segmental traverse 12, mounted to move on the bolster 9 of the main frame, and by a connection 13 trunnioned on the side bars 1 of the main frame, the arrangement being such that the superframe rocks on the trunnions supported by the side bars 1, being restrained from sidewise motion by guides 14 attached to the side bars 1 of the main frame, and 15 attached to the side bars 11 of the superframe, the intermediate axle 4 of the main frame rising or falling according to the road, while the superframe partakes of but a portion of the varying motion. Upon the superframe any desired body may be mounted, and according to the length of the superframe, may overhang the rear member of the main frame, or if shorter, a second body or trailer may be carried by the rear member of the main frame.

It will be understood that the only function of the guides 14 and 15 is to keep the superframe parallel with the front portion of the main frame and that this is not essential, since the superframe may be supported in various ways so long as provision is made for preventing interference between the body and wheels as well as for the relative longitudinal movement of the superframe and the main frame when either axle rises or falls. Whatever the arrangement employed, any upward or downward movement imparted to any of the axles by inequalities in the road will be transmitted only in part to the superframe and body, since the points of support of the superframe are located between the axles and on opposite sides of the pivotal connection between the front and rear portions of the main frame.

Having described my invention, I claim and desire to secure by Letters Patent of the United States:

1. A road vehicle comprising front, intermediate and rear axles, a main frame supported thereby and including front and rear portions having a universal pivotal connection there-between adapted to permit upward, downward, lateral and twisting movements of one portion relative to the other and a superframe supported by said portions of the main frame in front of and behind said pivotal connection and between the axles.

2. A road vehicle comprising front, intermediate and rear axles, a main frame supported thereby and including front and rear portions having a universal pivotal connection adjacent to and midway between the ends of the intermediate axle and a superframe supported in part by the front portion of the main frame at a point between the front and intermediate axles and in part by the rear portion of the main frame at a point between the intermediate and rear axles.

3. A road vehicle comprising front, intermediate and rear axles, a main frame including a front portion supported by the front and intermediate axles and a trailer portion supported by the intermediate and rear axles, a universal-joint connection between the front and trailer portions whereby the trailer portion is permitted universal movement relative to the front portion and a superframe supported in part by the front portion and in part by the trailer portion of the main frame.

4. A road vehicle comprising front, intermediate and rear axles, a main frame including a front portion supported by the front and intermediate axles and a trailer portion supported by the rear axle and having a universal-joint connection with said front portion, a superframe supported in part by the front portion and in part by the trailer portion of the main frame and movable laterally with relation to the latter, and guides for maintaining the superframe in longitudinal alinement with the front portion of the main frame and permitting relative upward and downward movements thereof.

5. A road vehicle comprising a main frame having front and rear portions connected by a universal joint, in combination with a superframe pivoted to one portion of the main frame and having a sliding support on the other portion of the main frame.

6. A road vehicle comprising a main frame including a front portion and a trailer portion pivotally connected thereto and adapted to travel in or out of the path thereof, a superframe trunnioned on the front portion of the main frame, a support carried by the trailer portion and having a sidewise sliding connection with the superframe, and guides carried by the front portion of the main frame and having a sliding connection with the superframe in an upward and downward direction.

In testimony whereof I have subscribed my name hereto in the presence of two subscribing witnesses.

WILLIAM HORACE MacKAY.

Witnesses:
  GEORGIE H. ANDREWS,
  GEORGE M. GRAHAM.